(12) United States Patent
Rosenthal et al.

(10) Patent No.: US 11,453,613 B2
(45) Date of Patent: Sep. 27, 2022

(54) JOINT COMPOUNDS, ACTIVATORS AND METHODS FOR SETTING A JOINT COMPOUND AND PREVENTING SEED SETTING

(71) Applicant: United States Gypsum Company, Chicago, IL (US)

(72) Inventors: Guy L. Rosenthal, Wheaton, IL (US); Charles J. Miller, Johnsburg, IL (US); Tyler Kincaid, Chicago, IL (US); Joseph Schlude, South Barrington, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 651 days.

(21) Appl. No.: 16/139,350

(22) Filed: Sep. 24, 2018

(65) Prior Publication Data

US 2019/0135697 A1 May 9, 2019

Related U.S. Application Data

(63) Continuation-in-part of application No. 15/805,854, filed on Nov. 7, 2017, now abandoned.

(51) Int. Cl.
*C04B 28/14* (2006.01)
*C04B 22/10* (2006.01)
(Continued)

(52) U.S. Cl.
CPC .............. *C04B 28/14* (2013.01); *C04B 22/10* (2013.01); *C04B 22/142* (2013.01);
(Continued)

(58) Field of Classification Search
USPC ........................................ 106/785, 772, 638
See application file for complete search history.

(56) References Cited

U.S. PATENT DOCUMENTS

| | | |
|---|---|---|
| 1,338,117 A | 4/1920 | Adamson |
| 2,031,898 A | 2/1936 | Marsh |
| (Continued) | | |

FOREIGN PATENT DOCUMENTS

| | | |
|---|---|---|
| CA | 2788841 A1 | 8/2011 |
| CN | 1155878 A | 7/1997 |
| (Continued) | | |

OTHER PUBLICATIONS

Ivanitskii, V. et al., "Self-aligining, non-cracking flooring-concretion-contains gypsum semi-hydrate, sodium tripolyphosphate, sulphurised naphtalene-formaldehyde resin and water", Thomson Scientific, Sep. 23, 1985, (SU1180362A, XP002788588), Abstract, 2 pages.
(Continued)

*Primary Examiner* — James E McDonough
(74) *Attorney, Agent, or Firm* — Greer, Burns & Crain, Ltd.; Philip T. Petti; Pradip Sahu

(57) ABSTRACT

A ready-mixed setting type joint compound in which formation of gypsum seeds has been inhibited. A method for controlling a setting reaction by mixing a ready-mixed setting type joint compound with one or more metal ion control agents comprising aminopolycarboxylic acid and/or a salt thereof, and further mixing the setting type joint compound with one or more non-calcium phosphate compounds. The method may further comprise mixing the setting type joint compound with a set activator obtained by blending together a first set activator including a cadmium compound, lead compound and/or zinc compound and a second set activator including a ferrous compound, aluminum compound and/or manganese compound.

7 Claims, 6 Drawing Sheets

(51) Int. Cl.

| | |
|---|---|
| *C04B 22/16* | (2006.01) |
| *C04B 24/12* | (2006.01) |
| *C04B 22/14* | (2006.01) |
| *C04B 40/06* | (2006.01) |
| C04B 9/04 | (2006.01) |
| C04B 11/00 | (2006.01) |
| C04B 7/00 | (2006.01) |
| C04B 7/34 | (2006.01) |
| C04B 28/00 | (2006.01) |
| C04B 32/00 | (2006.01) |
| C04B 111/00 | (2006.01) |
| C04B 103/22 | (2006.01) |
| C04B 103/12 | (2006.01) |

(52) U.S. Cl.
CPC ............ *C04B 22/147* (2013.01); *C04B 22/16* (2013.01); *C04B 24/123* (2013.01); *C04B 40/065* (2013.01); *C04B 2103/12* (2013.01); *C04B 2103/22* (2013.01); *C04B 2111/00637* (2013.01); *C04B 2111/00689* (2013.01)

(56) References Cited

U.S. PATENT DOCUMENTS

| | | |
|---|---|---|
| 2,113,370 A | 4/1938 | Dunn et al. |
| 2,216,207 A | 10/1940 | Menaul et al. |
| 2,216,555 A | 10/1940 | King et al. |
| 3,159,640 A | 12/1964 | McClure et al. |
| 3,223,082 A | 12/1965 | Smith |
| 3,297,601 A | 1/1967 | Maynard et al. |
| 3,386,223 A | 6/1968 | Wegwerth |
| 3,520,708 A | 7/1970 | Chambers et al. |
| 3,852,083 A | 12/1974 | Yang |
| 3,854,985 A | 12/1974 | Suzuki et al. |
| 3,867,335 A | 2/1975 | Reed et al. |
| 3,891,453 A | 6/1975 | Williams |
| 3,907,725 A | 9/1975 | Forte et al. |
| 3,935,021 A | 1/1976 | Greve et al. |
| 3,975,320 A | 8/1976 | Lane et al. |
| 3,998,769 A | 12/1976 | Lane et al. |
| 4,049,866 A | 9/1977 | Lane et al. |
| 4,075,374 A | 2/1978 | Jorgenson et al. |
| RE29,753 E | 9/1978 | Williams |
| 4,155,887 A | 5/1979 | Hetson |
| 4,157,264 A | 6/1979 | Kennedy-Skipton |
| 4,238,239 A | 12/1980 | Brown |
| 4,265,964 A | 5/1981 | Burkhart |
| 4,286,995 A | 9/1981 | Smith et al. |
| 4,294,622 A | 10/1981 | Brown |
| 4,370,167 A | 1/1983 | Mudd |
| 4,454,267 A | 6/1984 | Williams |
| 4,472,540 A | 9/1984 | Barker |
| 4,494,990 A | 1/1985 | Harris |
| 4,525,388 A | 6/1985 | Rehder et al. |
| 4,657,594 A | 4/1987 | Struss |
| 4,661,161 A * | 4/1987 | Jakacki ................ C04B 28/145 106/781 |
| 4,686,253 A | 8/1987 | Struss et al. |
| 4,824,879 A | 4/1989 | Montgomery et al. |
| 4,849,018 A | 7/1989 | Babcock et al. |
| 4,876,142 A | 10/1989 | Piccirillo |
| 4,904,709 A | 2/1990 | Hermele |
| 4,927,463 A | 5/1990 | Kloetzer et al. |
| 5,059,456 A | 10/1991 | Larson et al. |
| 5,116,222 A | 5/1992 | Futami et al. |
| 5,191,049 A | 3/1993 | Enomoto et al. |
| 5,258,069 A | 11/1993 | Knechtel et al. |
| 5,336,318 A | 8/1994 | Attard et al. |
| 5,366,547 A | 11/1994 | Brabston et al. |
| 5,437,722 A | 8/1995 | Borenstein |
| 5,633,310 A | 5/1997 | Sulser et al. |
| 5,653,797 A | 8/1997 | Patel |
| 5,746,822 A | 5/1998 | Espinoza et al. |
| 5,779,786 A | 7/1998 | Patel |
| 5,879,446 A | 3/1999 | Patel et al. |
| 5,879,825 A | 3/1999 | Burke et al. |
| 6,187,887 B1 | 2/2001 | Albrecht et al. |
| 6,299,679 B1 | 10/2001 | Montoya |
| 6,319,312 B1 | 11/2001 | Luongo |
| 6,342,284 B1 | 1/2002 | Yu et al. |
| 6,379,458 B1 | 4/2002 | Immordino |
| 6,402,832 B1 | 6/2002 | Vijayendran et al. |
| 6,406,537 B1 | 6/2002 | Immordino |
| 6,548,589 B2 | 4/2003 | Widmer et al. |
| 6,645,291 B2 | 11/2003 | Ayambem et al. |
| 6,663,979 B2 | 12/2003 | Deodhar et al. |
| 6,686,044 B2 | 2/2004 | Nakai et al. |
| 6,689,200 B2 | 2/2004 | Scarborough et al. |
| 6,740,395 B2 | 5/2004 | Halm et al. |
| 6,800,311 B2 | 10/2004 | Villwock |
| 6,805,741 B1 | 10/2004 | Liu et al. |
| 6,884,830 B1 | 4/2005 | Hornaman |
| 6,998,430 B2 | 2/2006 | Tanaski |
| 7,150,787 B2 | 12/2006 | Clamen et al. |
| 7,244,304 B2 | 7/2007 | Yu et al. |
| 7,256,227 B2 | 8/2007 | Stone |
| 7,803,225 B2 | 9/2010 | Zhang et al. |
| 2002/0038618 A1 | 4/2002 | Ayambem et al. |
| 2003/0113572 A1 | 6/2003 | Deodhar et al. |
| 2003/0118803 A1 | 6/2003 | Veerasuneni et al. |
| 2003/0134553 A1 | 7/2003 | Halm et al. |
| 2005/0161853 A1 | 7/2005 | Miller et al. |
| 2005/0229519 A1 | 10/2005 | Colbert et al. |
| 2006/0130708 A1 | 6/2006 | Calva Garcia et al. |
| 2006/0211805 A1 | 9/2006 | Willimann et al. |
| 2007/0044687 A1 | 3/2007 | Blackburn et al. |
| 2007/0227405 A1 | 10/2007 | Yu et al. |
| 2008/0160340 A1 | 7/2008 | Stocco |
| 2008/0229981 A1 | 9/2008 | Liu et al. |
| 2010/0175590 A1* | 7/2010 | Stevens ............... C04B 40/0658 106/773 |

FOREIGN PATENT DOCUMENTS

| | | |
|---|---|---|
| CN | 102712536 A | 10/2012 |
| EP | 1064236 | 1/2001 |
| EP | 2531460 B1 | 10/2018 |
| GB | 2426522 | 11/2006 |
| JP | 61-127656 | 11/1984 |
| JP | 06-330023 | 11/1994 |
| JP | 08-060139 | 3/1996 |
| JP | 2007-522067 | 8/2007 |
| JP | 2012-551953 | 2/2010 |
| KR | 10-0382873 | 9/2003 |
| KR | 2005-0072460 | 7/2005 |
| KR | 10-2006-0125872 | 12/2006 |
| SU | 1013432 | 4/1983 |
| SU | 1180362 A | 9/1985 |
| TW | 200930681 | 7/2009 |
| WO | WO9531415 A1 | 11/1995 |
| WO | 2005072948 | 8/2005 |
| WO | 2008082566 | 7/2008 |
| WO | WO2008115929 A1 | 9/2008 |
| WO | WO2011096925 A1 | 8/2011 |

OTHER PUBLICATIONS

Hawley's Condensed Chemical Dictionary, 14th edition, John Wiley & Sons, Inc., 2002, gypsum definition.
"Material Safety Data Sheet: Calcium Sulfate Hemihydrate", Fisher Scientific, Nov. 8, 2007 [Retrieved on Mar. 14, 2012], Retrieved from http:;;fscimage.fishersci.com/msda/04084.htm.
EP Communication dated Oct. 14, 2021 for European Application No. 18815066.8.
Zhang, J. "Basic Course of Cleaning Technology,China Environmental Science Press", Common knowledge, 2004, pp. 150-155, No. 7.
Liu, H., "Building Additives, China Architecture & Building Press", Common knowledge evidence 1, 2006, p. 285, vol. 2.
Chinese Office Action dated Sep. 6, 2021 for Chinese Application No. 201880069002.2.

(56) References Cited

OTHER PUBLICATIONS

Notification of Reasons for Rejection received in Japanese Application No. 2020-524884 dated Aug. 9, 2022.

* cited by examiner

JOINT COMPOUNDS, ACTIVATORS AND METHODS FOR SETTING A JOINT COMPOUND AND PREVENTING SEED SETTING

CROSS-REFERENCE TO RELATED APPLICATIONS

This application is a continuation-in-part of U.S. patent application Ser. No. 15/805,854 filed Nov. 7, 2017, the entire disclosure of which is herein incorporated by reference.

TECHNICAL FIELD

This invention relates to joint compounds and methods for preventing a gypsum seed setting. This invention also relates to blends of a fast-acting set activator and a slow-acting set activator for setting and hardening setting type joint compounds, and methods for controlling a setting reaction with the blends.

BACKGROUND

Joint compounds are commonly used in building construction. One of the applications is to patch a seam between two gypsum panels. Typically, interior walls are made by attaching gypsum panels (also referred to as wallboard) to studs. A joint compound is then used to fill and coat seams (also referred to as joints) between the gypsum panels.

Two types of joint compounds are known: a setting-type joint compound and a drying-type joint compound. A setting-type joint compound comprises calcium sulfate hemihydrate which may be referred to in this disclosure as calcined gypsum. Setting-type joint compounds set via a setting reaction in which calcium sulfate hemihydrate (calcined gypsum) hydrates into calcium sulfate dihydrate (gypsum).

A setting-type joint compound can be formulated as a dry powder which is mixed with water prior to an application. Adding water to the dry powder initiates conversion of calcined gypsum into gypsum, which triggers setting and hardening of the joint compound.

A setting-type joint compound can be also formulated as a ready-mixed setting type joint compound which is already mixed with water. Ready-mixed setting type joint compounds are already pre-mixed with water, yet these compounds can be stored on a shelf for a period of time without a setting reaction by which calcined gypsum is converted into gypsum. In order to inhibit the setting reaction during storage and transportation, the ready-mixed setting type joint compounds contain at least one retarder which inhibits the setting reaction in which calcined gypsum is hydrated into gypsum. Various set retarders are known, including non-calcium phosphate compounds as provided in U.S. Pat. No. 5,746,822, a combination of a proteinaceous retarder and a chelating agent as provided in U.S. Pat. No. 4,661,161 and low molecular weight polyacrylates as provided in U.S. Pat. No. 5,779,786.

An activator is then added to a ready-mixed setting type joint compound in order to initiate a setting reaction. Various activators are known, including zinc sulfate as provided in U.S. Pat. No. 5,746,822 assigned to the United States Gypsum Company. However, large amounts of zinc sulfate may be needed or a setting reaction may proceed very slowly. Many attempts have been also made to use alum as an activator. However, it is difficult to control a setting reaction with alum because alum is considered to be incompatible with formulations comprising calcium carbonate in a gypsum-based compound, yet many setting type joint compounds contain calcium carbonate.

Further difficulties in controlling a setting reaction may arise if a setting type joint compound has to be used under a temperature lower than 15° C. because a setting reaction can be significantly slowed under these conditions even if an activator has been added.

Thus, there remains a need in the art for a set activator which can be used for controlling a setting reaction in a broad spectrum of setting type joint compounds.

Ready-mixed setting type joint compounds typically comprise one or more set retarders which prevent a premature hydration and setting of calcined gypsum. Suitable set retarders include non-calcium phosphate compounds, including those disclosed in U.S. Pat. No. 5,746,822, a combination of a proteinaceous retarder and a chelating agent as provided in U.S. Pat. No. 4,661,161 and low molecular weight polyacrylates, including those disclosed in U.S. Pat. No. 5,779,786.

A seed setting is a formation of gypsum agglomerates, referred to as gypsum seeds, in a setting type joint compound mixture which is normally is paste-like. The seed setting may occur even in a setting type joint compound which comprises a retarder. The seed setting is undesirable because it interferes with workability of a setting type joint compound. Thus, there remains a need in the art for setting type joint compound formulations in which the seed setting is prevented or minimized.

SUMMARY

In one aspect, this disclosure provides a method for controlling the setting reaction in a ready-mixed setting type joint compound and inhibiting a formation of gypsum seeds in the ready-mixed setting type joint compound.

The method comprises mixing at least calcined gypsum, water, at least one non-calcium phosphate compound, and at least one metal ion control agent comprising an aminopolycarboxylic acid and/or a salt thereof, and thereby obtaining a ready mixed setting type joint compound; and thereby inhibiting formation of gypsum seeds in the ready-mixed setting type joint compound.

The method may further comprise: blending together a first set activator comprising a cadmium compound, lead compound and/or zinc compound and a second set activator comprising a ferrous compound, aluminum compound and/or manganese compound, and thereby obtaining a set activator blend; and mixing the set activator blend with the ready mixed setting type joint compound and thereby controlling the setting reaction of the setting type joint compound.

The first set activator may be zinc oxide, zinc hydroxide and/or zinc salt. The second set activator may be aluminum oxide, aluminum hydroxide and/or aluminum salt. In some preferred embodiments, the first set activator is zinc sulfate and the second set activator is alum. In some preferred embodiments, the first set activator is zinc sulfate and the second set activator is alum, and zinc sulfate and alum are used in a ratio in the range from 3:1 to 1:1 by dry weight of zinc sulfate to alum.

In some preferred embodiments, the first set activator is zinc sulfate and the second set activator is alum, and zinc sulfate and alum are used in a ratio in the range from 3:1 to 1:1 by dry weight of zinc sulfate to alum and further, the set activator blend is mixed with the ready-mixed setting joint compound in an amount in the range from 0.5% to 5% by weight of dry ingredients in the ready-mixed setting type joint compound.

In the present methods, the setting type joint compound may be a ready-mixed compound. In the present methods, the non-calcium phosphate compound may comprise zinc hexametaphosphate, potassium tripolyphosphate, tetra sodium pyrophosphate, tetra potassium pyrophosphate, sodium tripolyphosphate, mono-ammonium phosphate, monobasic potassium phosphate, or any combination thereof.

In the present methods, the metal ion control agent may comprise diethylenetriamine pentaacetic acid (DTPA), pentasodium diethylenetriamine pentaacetate, calcium trisodium diethylenetriamine pentaacetate, ethylenediamine tetraacetic acid (EDTA), sodium calcium edetate, hydroxyethyl-ethylene-diaminetriacetic acid (HEDTA), trisodium N-(hydroxyethyl)-ethylenediaminetriacetate, or any combination thereof.

In the present methods, from about 0.01% to about 10% by weight of the metal ion control agent may be used, calculated as a percentage of the weight of dry calcined gypsum. In the present methods, from about 0.01% to about 10% by weight of the non-calcium phosphate compound may be used, calculated as a percentage of the weight of dry calcined gypsum.

In the present methods, the metal ion control agent may comprise pentasodium diethylenetriamine pentaacetate in an amount from about 0.01% to about 10% by weight, based on the weight of dry calcined gypsum and the non-calcium phosphate compound may comprise tetra-potassium pyrophosphate (TKPP) in an amount from about 0.01% to about 10% by weight, tetra-sodium pyrophosphate (TSPP) in an amount from about 0.01% to about 10% by weight, or a combination of TKPP and TSPP in an amount from about 0.01% to about 10% by weight, based on the weight of dry calcined gypsum.

In the present methods, at least one of the following may be further mixed with the ready-mixed setting type joint compound: a binder, calcium carbonate, mica, talc, clay, a low molecular weight polymer, or any combination thereof.

The mixing of the set activator blend with the ready-mixed setting type joint compound may be performed at a temperature in the range from 40° F. to 95° F. The first activator may be zinc sulfate and the second activator may be alum, the setting type joint compound comprises calcium carbonate and the mixing is performed at a temperature in the range from 40° F. to 75° F. In some embodiments, the first activator is zinc sulfate and the second activator is alum, the ratio of zinc sulfate to alum is from 3:1 to 1:1 by dry weight, the setting type joint compound comprises calcium carbonate and the mixing is performed at a temperature in the range from 40° F. to 65° F., and wherein the set activator blend is added in an amount from 0.5% to 5% by weight to the setting type joint compound, excluding water.

Further aspects of this disclosure are directed to a ready-mixed setting type joint compound which comprises between 0.01% to 10% of a metal ion control agent comprising an aminopolycarboxylic acid and/or a salt thereof by weight, based on the weight of calcined gypsum and the setting joint compound further comprising between 0.01% to 10% of non-calcium phosphate compound by weight, based on the weight of calcined gypsum.

The ready-mixed setting type joint compounds include those compounds in which the metal ion control agent comprises diethylenetriamine pentaacetic acid (DTPA), pentasodium diethylenetriamine pentaacetate, calcium trisodium diethylenetriamine pentaacetate, ethylenediamine tetraacetic acid (EDTA), sodium calcium edetate, hydroxyethyl-ethylene-diaminetriacetic acid (HEDTA), trisodium N-(hydroxyethyl)-ethylenediaminetriacetate, or any combination thereof. The ready-mixed setting type joint compounds include those compounds in which the non-calcium phosphate compound comprises zinc hexametaphosphate, potassium tripolyphosphate, tetra sodium pyrophosphate, tetra potassium pyrophosphate, sodium tripolyphosphate, mono-ammonium phosphate, monobasic potassium phosphate, or any combination thereof. The metal ion control agent may comprise pentasodium diethylenetriamine pentaacetate, and the non-calcium phosphate compound may comprise tetra potassium pyrophosphate, tetra sodium pyrophosphate or any combination thereof.

DETAILED DESCRIPTION

Figure 1:
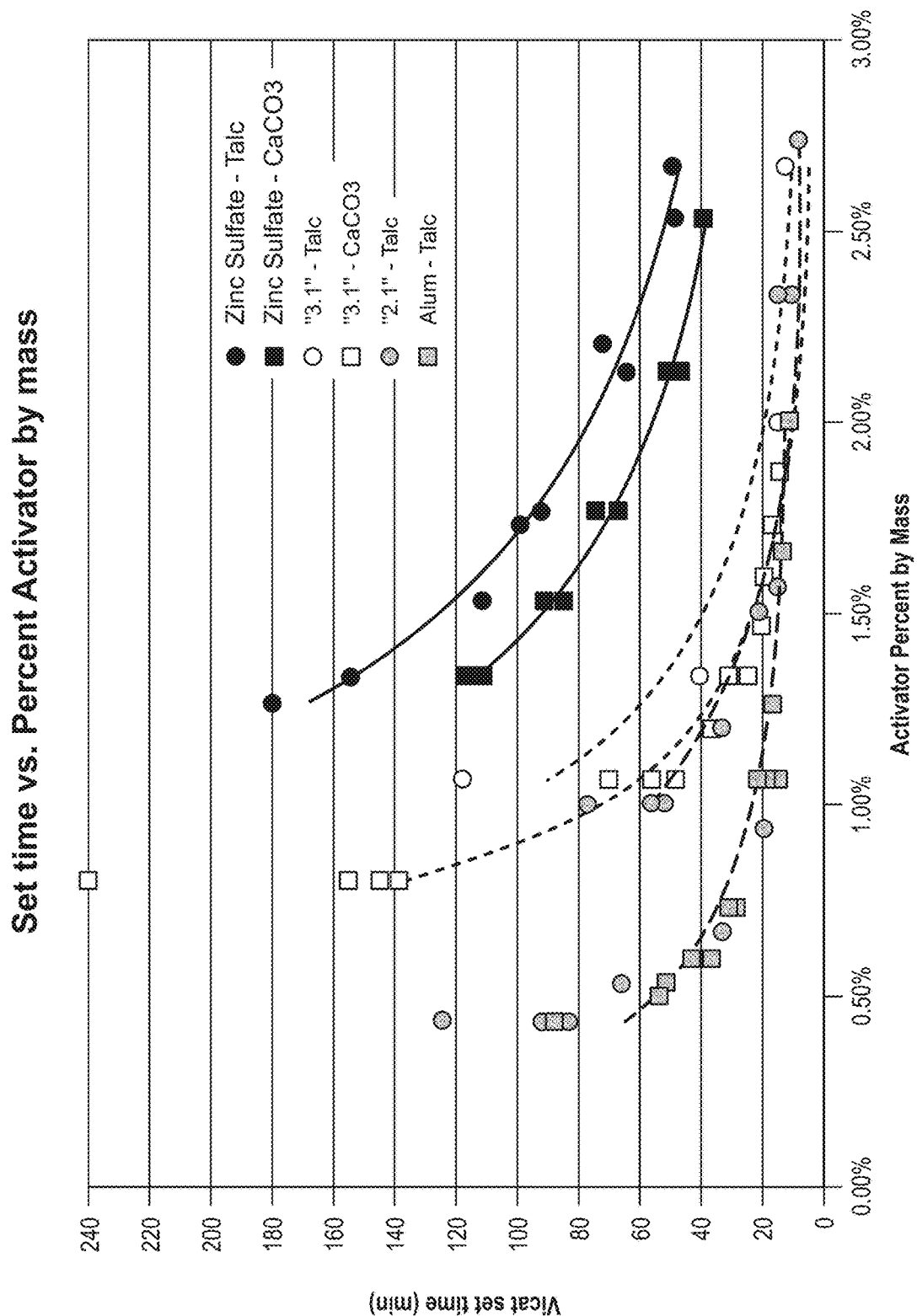
FIG. 1 is a plot of a set time as a function of an amount of activator added.

In one aspect, this disclosure provides blends of two set activators. The blends are suitable for controlling the setting reaction of ready mixed setting type joint compounds in a great range of temperatures.

The term "set activator" refers to a compound which can activate, accelerate or otherwise speed up the setting reaction of calcium sulfate hemihydrate in a joint compound comprising a calcium ion chelating agent. Set activators are compounds comprising cations which have a log K value higher than calcium, wherein "K" is the equilibrium constant of a chelating reaction. Compounds that may act as a set activator may comprise any of the following cations: ferric, mercury, cupric, nickel, cobalt, cadmium, lead, zinc, ferrous, aluminum, and manganese.

A blend of two set activators provided in this disclosure comprises a first set activator and a second set activator. The first set activator may be selected from a compound comprising any of the following cations: cadmium, lead and/or zinc. Suitable first activator compounds may be in the form of salts, oxides and/or hydroxides. Particularly preferred as the first set activator is a compound comprising zinc cations. Such zinc compounds include, but are not limited to, zinc oxide, zinc hydroxide and zinc salts. Suitable salts include, but are not limited to, zinc nitrate, zinc chloride, zinc chlorate, zinc sulfate, zinc sulfide, zinc phosphate, zinc molybdate, zinc chromate, and zinc acetate. A particularly preferred as the first activator is zinc sulfate. The general chemical formula for zinc sulfate is $ZnSO_4$. However, it will be understood that the term "zinc sulfate" in this disclosure also includes any of the three zinc sulfate hydrates, including zinc sulfate heptahydrate.

The second activator in the blend can be selected from a compound comprising any of the following cations: ferrous, aluminum and/or manganese. Suitable second activator compounds may be in the form of salts, oxides and/or hydroxides. Particularly preferred as the second activator is a compound comprising aluminum. Such aluminum compounds include, but are not limited to, aluminum oxide, aluminum hydroxide and aluminum salts. Suitable salts include, but are not limited to, aluminum chloride, aluminum sulfate, aluminum ammonium sulfate, and aluminum potassium sulfate. A particularly preferred as the second activator is aluminum sulfate. In this disclosure, the term "aluminum sulfate" is used interchangeably with the term "alum." The chemical formula for aluminum sulfate which is also referred to as alum is $Al_2(SO_4)_3$. It will be understood that the term "aluminum sulfate or alum" also includes anhydrous aluminum sulfate and aluminum sulfate hydrates, including 18-hydrate aluminum sulfate.

A blend of the first activator and the second activator may comprise: 1) at least one compound selected from a cadmium compound, lead compound and/or zinc compound; and 2) at least one compound selected from a ferrous compound, aluminum compound and/or manganese compound. In the blend, the ratio of the first activator to the second activator may vary and it may be in the range from 99:1 to 1:99 by weight of the first activator to the second activator.

A set activator blend of the present disclosure can be used in any amount sufficient to activate the setting reaction in a setting type joint compound. Typically, these blends can be used in an amount from 0.5% to 5% of a setting type joint compound by weight of dry ingredients, water excluded.

Some blends of this disclosure may comprise zinc oxide, zinc hydroxide and/or zinc salt and a ferrous compound, aluminum compound and/or manganese compound.

At least some blends of this disclosure may comprise as the first activator zinc oxide, zinc hydroxide and/or zinc salt and also aluminum oxide, aluminum hydroxide and/or aluminum salt as the second activator.

Some blends of this disclosure may comprise a cadmium compound, lead compound and/or zinc compound and at least one of aluminum oxide, aluminum hydroxide and/or aluminum salt.

Some blends of this disclosure may comprise a zinc salt and aluminum oxide, aluminum hydroxide and/or aluminum salt.

A preferred set activator blend of this disclosure may comprise, contain, consist essentially of or consist of zinc sulfate as the first activator and aluminum sulfate as the second activator. In the blend, the ratio of the first activator to the second activator may vary and it may be in the range from 99:1 to 1:99 by dry weight of the first activator to the second activator. Most preferred ranges of zinc sulfate to aluminum sulfate are in the range from 3:1 to 1:1 by dry weight of zinc sulfate to aluminum sulfate. These preferred set activator blends can be used in an amount from 0.5% to 5% of a setting type joint compound by weight of dry ingredients, water excluded.

A set activator blend of the present disclosure can be used to control the setting reaction of any setting type joint compound formulated with or without a set retarder. A set activator blend of the present disclosure can be used to control the setting reaction of a ready-mixed setting type joint compound which is formulated with a retarder. A set activator blend of the present disclosure can be also used to control the setting reaction of a setting type joint compound formulated as a dry powder and mixed with water during the use. These dry-powder setting type joint compounds may or may not comprises a retarder. If a set activator blend of the present disclosure is used to control the setting reaction of a setting type joint compound which does not comprise a retarder, the activator blend is used as an accelerator to prevent foaming and accelerate the setting reaction.

The set activator blends of the present disclosure are particularly useful for controlling the setting reaction of a ready-mixed setting type joint compound which comprises at least one set retarder. Such set retarders may include calcium-chelating agents. The set retarder can be any of non-calcium bearing phosphates, including zinc hexametaphosphate, potassium tripolyphosphate, tetra-sodium pyrophosphate, tetra-potassium pyrophosphate, sodium tripolyphosphate, mono-ammonium phosphate and/or monobasic potassium phosphate. Other set retarders may include a proteinaceous retarder, such as SUMA set retarder. Set retarders may also include any of low molecular weight polymers, such as a low molecular weight polyacrylate, including a co-polymer composition containing acrylic acid and acrylamide monomer units or a blend of an acrylic acid homo-polymer and an acrylamide homo-polymer.

The set activator blends of the present disclosure can be used to control the setting reaction in a setting type joint compound with any of the set retarders (non-calcium bearing phosphates, proteinaceous retarders, low molecular weight polymers) which can be used individually or in combination with one another in any useful amount.

The set activator blends of the present disclosure can be used to control the setting reaction of a setting type joint compound comprising any calcium sulfate hemihydrate, including compounds which comprise calcium sulfate in the alpha-hemihydrate form, calcium sulfate in the beta-hemihydrate form, synthetic calcium sulfate hemihydrate, and any combinations thereof.

The set activator blends of the present disclosure can be used to control the setting reaction of either ready mixed or dry powder light or conventional weight setting type joint compounds. Suitable compounds include those which comprise calcium carbonate, mica, talc and/or clays.

The present set activator blends provide a choice of setting times which can be customized on demand at a construction site, depending on a time which is needed to complete a particular project and on a temperature at which a setting type joint compound is to be used in the particular project.

The setting time of a setting type joint compound depends on a temperature at which the setting type joint compound is hardening. Typically, the setting reaction proceeds more slowly at a lower temperature. Thus, there may be a fluctuation in the setting time for wallboard installation projects completed during cold months when a temperature is below 60° F. and similar installation projects which are completed during summer months when a temperature is above 60° F. Under some circumstances, the setting reaction in a setting type joint compound cannot be completed satisfactory with prior art activators at a temperature lower than 50° F.

One of the technical advantages provided by the present set activator blends is these blends can speed up a rate of the setting reaction at a lower temperature in the range from 40° F. to 60° F. Accordingly, an installation project can proceed under the same schedule despite a seasonal fluctuation in temperatures. Thus, the set activator blends provide important labor and material cost savings.

Referring to FIG. 1, it reports the set time for ready-mixed setting type joint compounds as a function of the amount of a set activator added. The ready-mixed setting type compounds comprise a set retarder. The set time is measured in minutes. The amounts of activators added are by mass % from the mass of dry ingredients in a joint compound, water excluded. As a control, zinc sulfate is tested for initiating the setting reaction of the setting type joint compound that comprises talc (curve 1) and also for initiating the setting reaction of the setting type joint compound that comprises calcium carbonate (curve 2). As another control, alum is tested for initiating the setting reaction of the setting type joint compound that comprises talc (curve 6). The setting reaction with alum proceeds much quicker than a reaction with zinc sulfate (compare curve 2 versus curve 6). Unexpectedly, a synergistic kinetics is uncovered in various setting reactions with a blend of zinc sulfate and alum. This synergistic effect is observed for both a setting type compound comprising talc (see curve 3) and also a setting type compound comprising calcium carbonate (see curve 4). The rate of the setting reaction can be tightly controlled by varying a ratio between zinc sulfate and alum (compare curve 3 of a setting reaction with the 3:1 ratio of zinc sulfate to alum to curve 5 of a setting reaction with the 2:1 ratio of zinc sulfate to alum).

Figure 2:
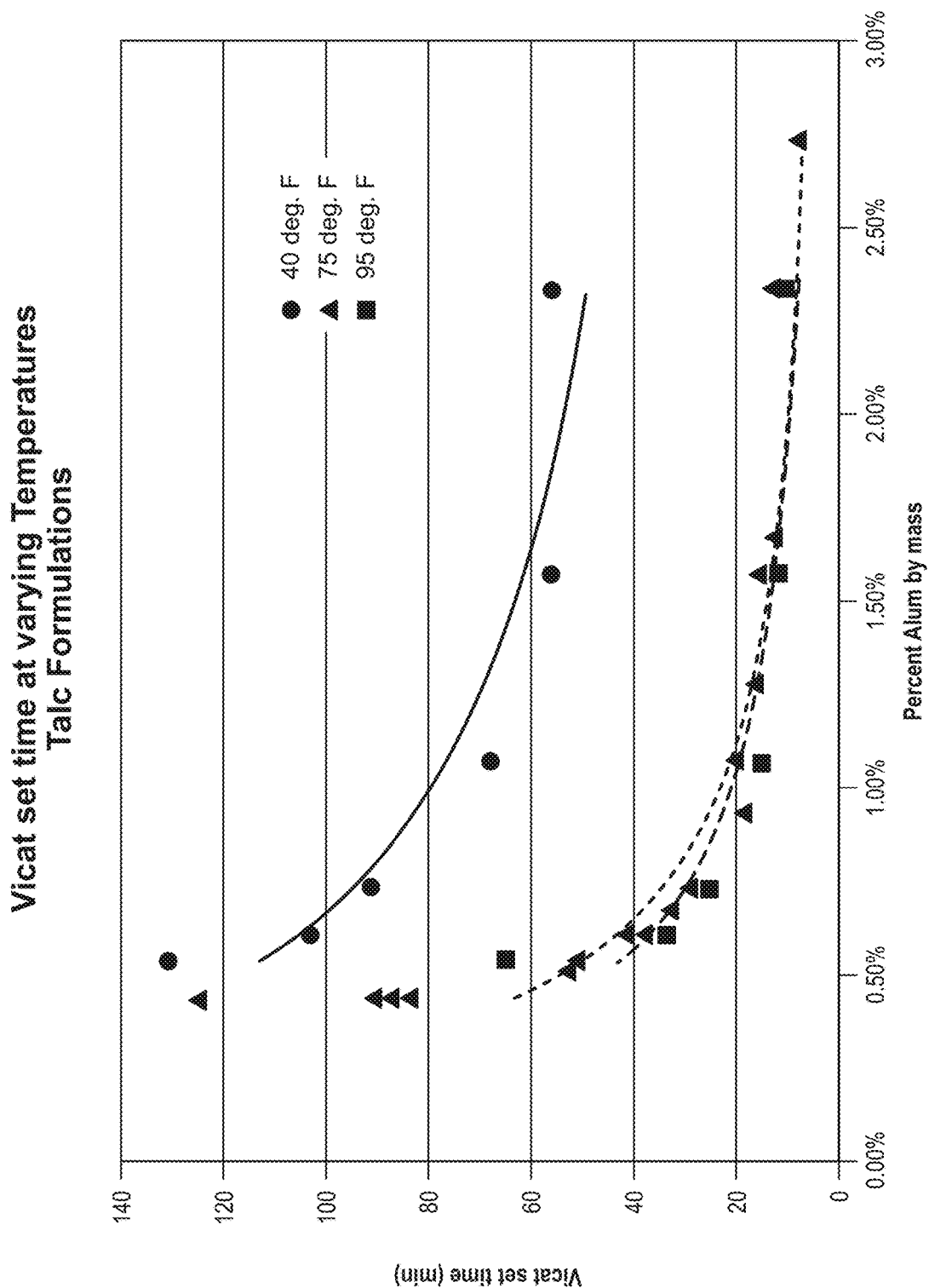
FIG. 2 is a plot of a set time as a function of temperature and an amount of alum activator added.

Referring to FIG. 2, it reports a set time as a function of temperature for ready-mixed setting type joint compounds comprising talc and a set retarder. In these compounds, the setting reaction was initiated with various amounts of alum at 40° F. (curve 1), 75° F. (curve 2) or 95° F. (curve 3). While there is not much difference in the setting reaction performed at either 75° F. or 95° F. (curves 2 and 3, respectively), the setting reaction is significantly inhibited at 40° F. (curve 1). Yet, a set time of 60 minutes can be still achieved by increasing the amount of alum used.

Figure 3:
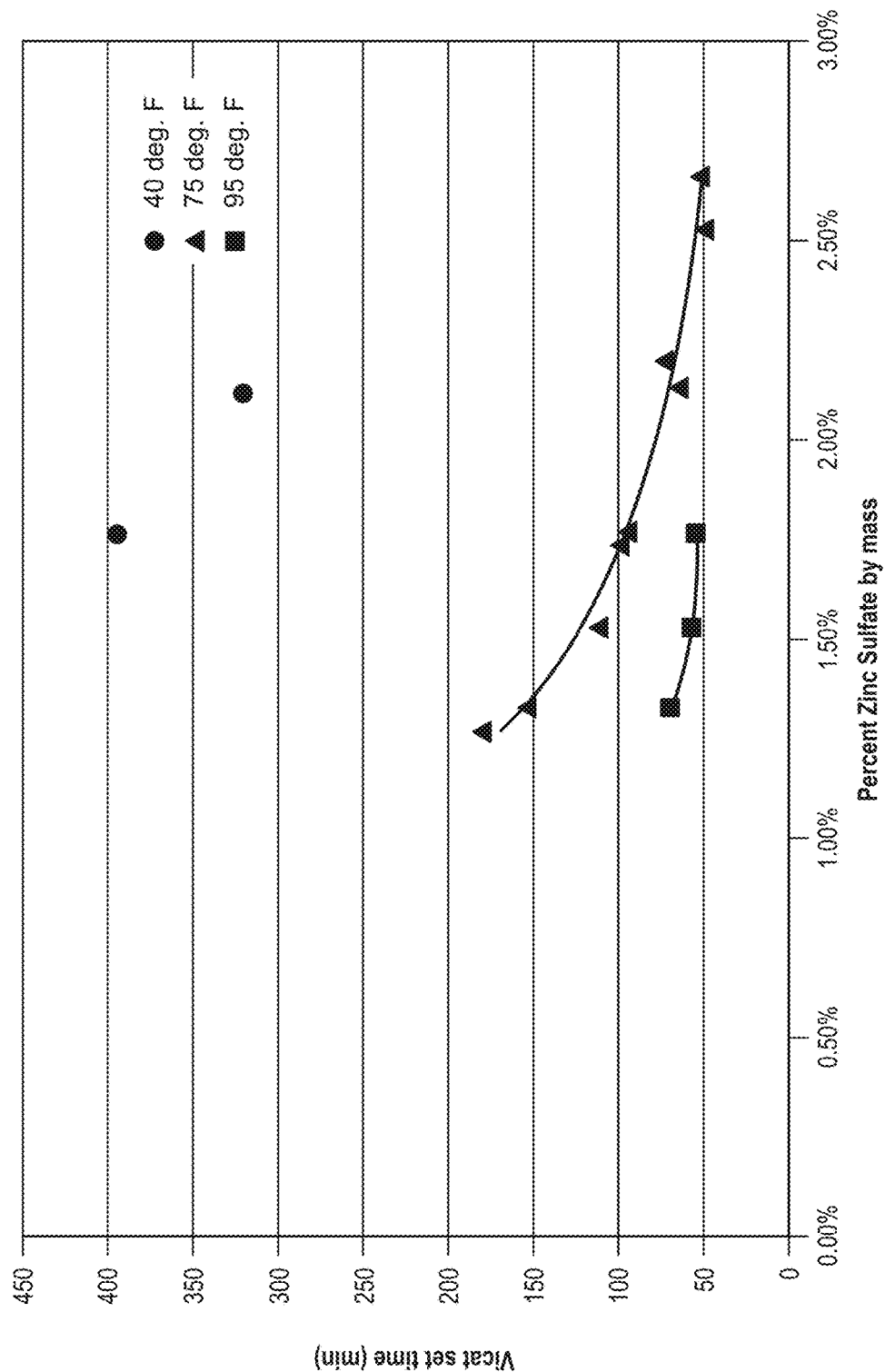
FIG. 3 is a plot of a set time as a function of temperature and an amount of zinc sulfate added.

Referring to FIG. 3, it reports a set time as a function of temperature for ready-mixed setting type joint compounds comprising talc and a set retarder. In these compounds, the setting reaction was initiated with various amounts of zinc at 40° F. (curve 1), 75° F. (curve 2) or 95° F. (curve 3). Unlike alum, zinc sulfate does not initiate setting reactions efficiently at 40° F. (curve 1). A significant difference in also observed in a rate of the setting reaction performed at 75° F. (curve 2) versus 95° F. (curve 3) if zinc sulfate is used in amounts of less than 2% by weight of dry components in a setting type joint compound.

Figure 4:
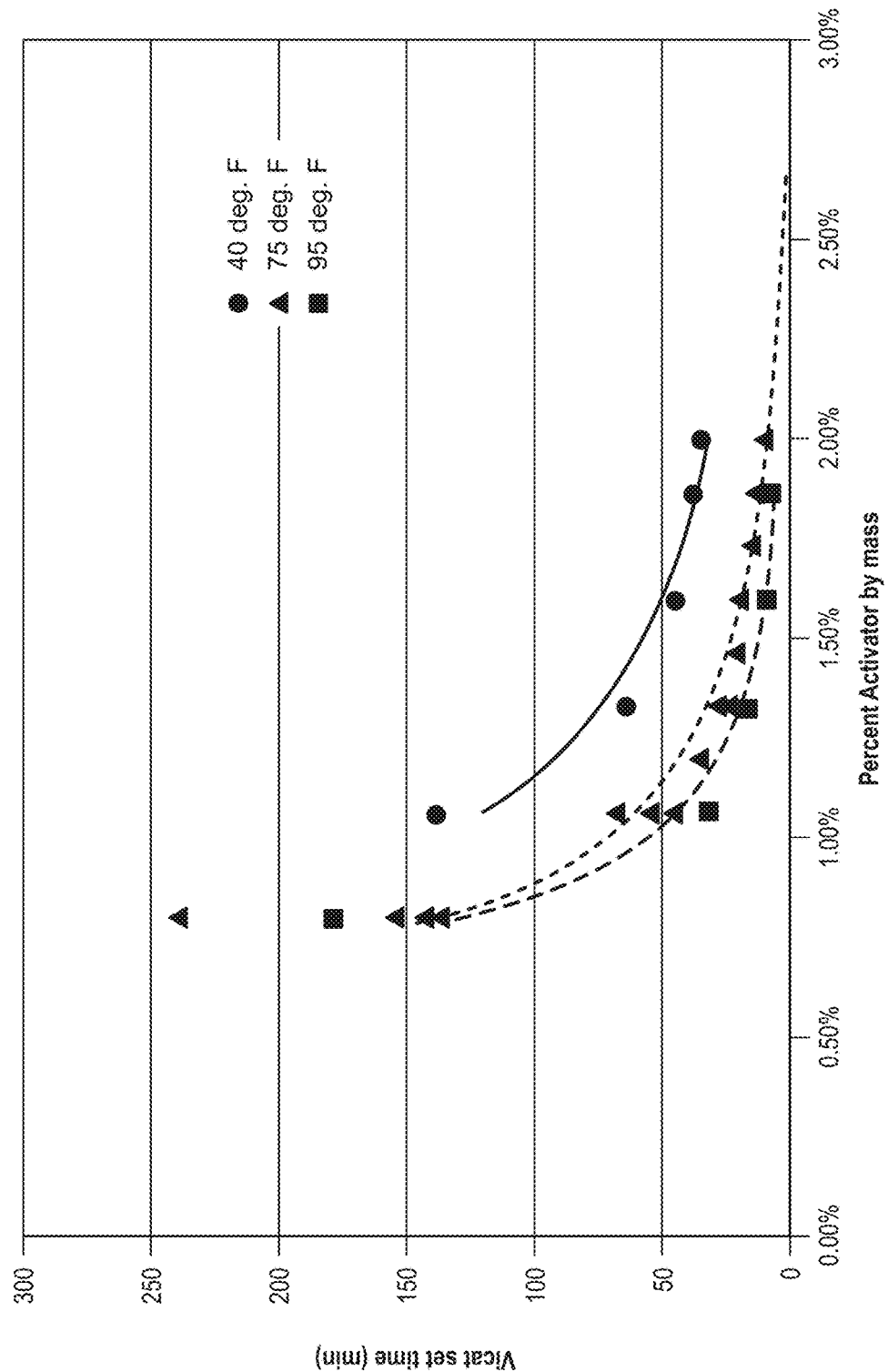
FIG. 4 is a plot of a set time as a function of temperature and an amount of a blend of alum and zinc sulfate added.

Referring to FIG. 4, it reports a set time as a function of temperature for ready-mixed setting type joint compounds comprising calcium carbonate and a set retarder. In these compounds, the setting reaction was initiated with a blend of zinc sulfate and alum in 3:1 ratio respectively at 40° F. (curve 1), 75° F. (curve 2) or 95° F. (curve 3). Unlike alum, zinc sulfate does not initiate setting reactions efficiently at 40° F. (curve 1). Unlike zinc sulfate alone, a blend of zinc sulfate and alum activates a setting reaction at 40° F. very efficiently (curve 1). The blend also works very efficiently in amounts lower than zinc sulfate alone. Importantly, no significant adverse reaction was observed when calcium carbonate was present in the setting type formula even as one of the activators in the blend was alum. This is also a significant improvement over reactions performed with alum alone.

In connection with FIGS. 1-4, Vicat set time is a period of time needed for a setting type joint compound to solidify or harden from the moment when an activator (or activator blend) is added to a ready-mixed setting type joint compound. The set time is measured with a Vicat needle which is held vertically at the surface of a setting type joint compound mixture and allowed to sink of its own weight into the mixture if the mixture has not solidified or hardened yet.

A set activator blend of the present disclosure may be sold as a kit comprising two activators, a first activator selected from a cadmium compound, lead compound and/or zinc compound in a first package and a second activator selected from a ferrous compound, aluminum compound and/or manganese compound in a second package. The kit may further comprise an instruction manual. The instruction manual can be in electronic format. The instruction manual may comprise charts providing the amount of the first activator and the second activator to be used in a blend depending on at least one of the following parameters: 1) a temperature at a construction site at the time of use; and/or 2) a set time needed.

In one aspect, the present disclosure provides a kit comprising zinc sulfate in a first package and alum in a second package. The kit may further comprise an instruction manual which lists ratios in which zinc sulfate and alum may be blended in order to achieve a needed set time at various temperatures.

In another aspect, the present disclosure provides a method for controlling the setting reaction of a setting type joint compound at a broad range of temperatures. In the method, the setting reaction is controlled with any of the set activator blends of the present disclosure. Suitable joint compounds include ready-mixed type setting joint compounds comprising at least one retarder. The retarder may comprise a calcium-free phosphate compound.

In further aspect, the present disclosure provides a method for controlling the setting reaction of a setting type joint compound, including a ready-mixed setting type joint compound, at a broad range of temperatures with a blend of zinc sulfate and alum. In the method, zinc sulfate and alum are blended together in a ratio in the range from 3:1 to 2:1 by dry weight of zinc sulfate to alum. The blend is then used in an amount from 0.5% to 3% by weight of a setting type joint compound, excluding water. The method can be performed at a temperature in the range from about 40° F. to about 95° F. The method can be performed with various setting type joint compounds, including ready-mixed setting type joint compounds comprising at least one retarder. The retarder may be a calcium-free phosphate compound, a low molecular weight polymer or any combination thereof. The method can be performed with either a ready mixed or dry powder conventional or light-weight setting type joint compound comprising perlite, expanded perlite, vermiculate, or any combination thereof.

A "seed setting" is a formation of gypsum agglomerates, hereafter referred to as gypsum seeds, in an otherwise homogenous ready-mixed setting type joint compound paste during storage and transportation and/or at the time when the dry components are mixed with water. It will be appreciated that the "setting type joint compound" means a compound which comprises calcined gypsum. It will be further appreciated that "the ready-mixed setting type joint compound or the ready-mixed setting type compound" means a joint compound which comprises calcined gypsum, water and at least one retarder of the setting reaction which hydrates calcined gypsum into gypsum. Such set retarders may include calcium-chelating agents. The set retarder may include any of non-calcium bearing phosphates, including zinc hexametaphosphate, potassium tripolyphosphate, tetra-sodium pyrophosphate, tetra-potassium pyrophosphate, sodium tripolyphosphate, mono-ammonium phosphate and/ or monobasic potassium phosphate. Other set retarders include a proteinaceous retarder, such as SUMA set retarder. Set retarders may also include any of low molecular weight polymers, such as a low molecular weight polyacrylate, including a co-polymer composition containing acrylic acid and acrylamide monomer units or a blend of an acrylic acid homo-polymer and an acrylamide homo-polymer.

Figure 5A:
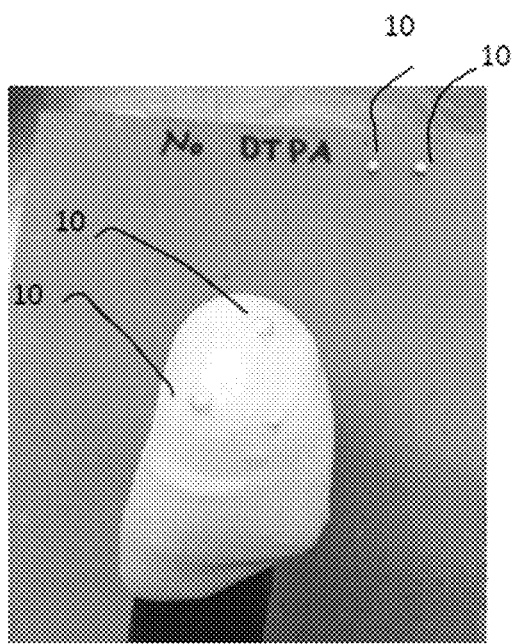
FIG. 5A is a picture of a ready-mixed setting type joint compound which does not comprise pentasodium DTPA.

Referring to FIG. 5A, this is a picture of a ready-mixed setting type joint compound after being stored on a shelf for a period of time. Gypsum seeds (10) are visible in the compound. Two gypsum seeds (10) isolated from the ready-mixed setting type joint compound are also shown in the right upper corner of FIG. 5A. The size of a gypsum seed may vary, typically gypsum seeds may be of about 2 mm to about 1 cm in a diameter.

Figure 6A:
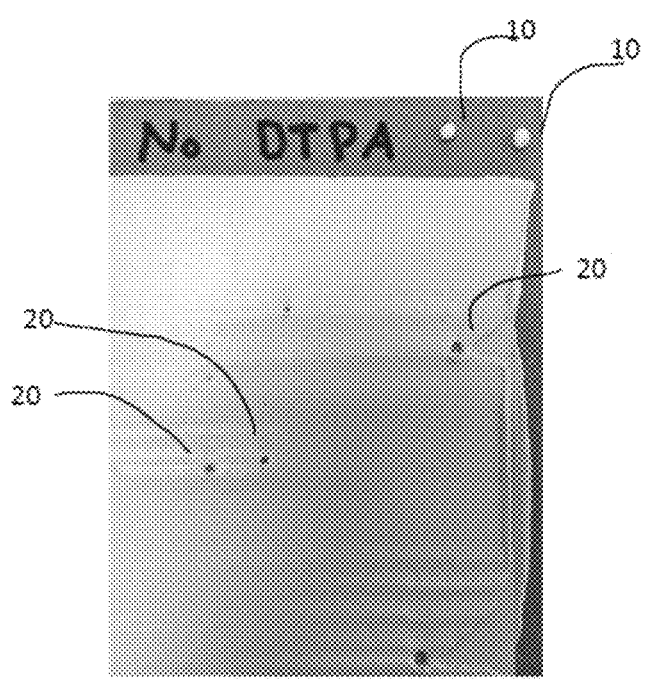
FIG. 6A is a picture showing application to a substrate of a ready-mixed setting type joint compound which does not comprise pentasodium DTPA.

Once gypsum seeds have been formed in a setting type joint compound, the gypsum seeds cannot be easily dissolved. The gypsum seeds must be then removed from the ready mixed setting type joint compound mixture, for example by filtering or sifting before the compound can be applied to a substrate. This point is illustrated in FIG. 6A which shows that applying a ready-mixed setting type joint compound comprising gypsum seeds results in an uneven surface with voids (20) which are caused by gypsum seeds (10). Thus, the seed setting is undesirable because it may contribute to disintegration and premature hardening of a ready-mixed setting type joint compound during storage and transportation. It is also difficult to apply the compound which comprises gypsum seeds to a substrate as the application produces an even surface. The seed setting should be also avoided at a job site during mixing of a dry powder setting type joint compound with water as the gypsum seeds may clog a mixer.

Without wishing to be bound by any theory, it is believed that the seed setting may be triggered by metal ions, including iron, aluminum, zinc and some others. Such metal ions often present as contaminants in water used for making a joint compound and/or in other components used for making a joint compound, such as for example, as calcium carbonate and/or calcined gypsum.

In further aspect, the present disclosure provides a joint compound formulation, in particular a ready-mixed setting type joint compound, in which formation of gypsum seeds is minimized during storage and/or while mixing a dry powder setting type joint compound with water.

The present ready-mixed setting type joint compounds comprise at least one metal ion control agent comprising an aminopolycarboxylic acid and/or a salt thereof. These agents are referred to in this disclosure as a MIC agent. A ready-mixed setting type joint compound which comprises at least one MIC agent comprising an aminopolycarboxylic acid and/or a salt thereof is referred in this disclosure as a MIC joint compound. The MIC compounds according to this disclosure comprise calcined gypsum, water, at least one set retarder and at least one MIC agent. It has been unexpectedly found that formation of gypsum seeds is minimized, delayed or completed prevented in the MIC joint compounds.

One preferred metal ion control (MIC) agent used in the MIC joint compounds according to this disclosure comprises diethylenetriamine pentaacetic acid (DTPA) and/or its salts, such as for example, pentasodium diethylenetriamine pentaacetate or calcium trisodium diethylenetriamine pentaacetate. Other suitable MIC aminopolycarboxylic acid agents include ethylenediamine tetraacetic acid (EDTA) and/or its salts, such as for example, sodium calcium edetate; and also hydroxy-ethyl-ethylene-diaminetriacetic acid (HEDTA) and its salts, such as for example, trisodium N-(hydroxyethyl)-ethylenediaminetriacetate.

Some of these aminopolycarboxylic acid compounds are available as aqueous solutions from the Dow Chemical Company under trade names VERSENEX™ 80 chelating agent which comprises an aqueous solution of pentasodium diethylenetriamine pentaacetate; VERSENE™ 100 chelating agent which comprises an aqueous solution of tetrasodium ethylenediamine tetraacetate and VERSENOL™ 120 chelating agent which comprises an aqueous solution of trisodium N-(hydroxyethyl)-ethylenediaminetriacetate.

It has been unexpectedly discovered that formulating a ready mixed setting type joint compound with a metal ion control agent comprising an aminopolycarboxylic acid and/or a salt thereof, may prevent, diminish or inhibit a seed setting reaction typically observed in a ready mixed setting type joint compound formulated with other ion chelators, such as for example, non-calcium phosphate compounds.

Figure 5B:
FIG. 5B is a picture of a MIC ready-mixed setting type joint compound which comprises pentasodium DTPA.

Referring to FIG. 5B, this is a picture of a MIC ready-mixed setting type joint compound comprising MIC agent pentasodium diethylenetriamine pentaacetate. No formation of gypsum seeds is detected in comparison to a ready-mixed setting type joint compound of FIG. 5A which was formulated without DTPA or any other MIC agent, and in which gypsum seeds (10) are noticeable.

Figure 6B:
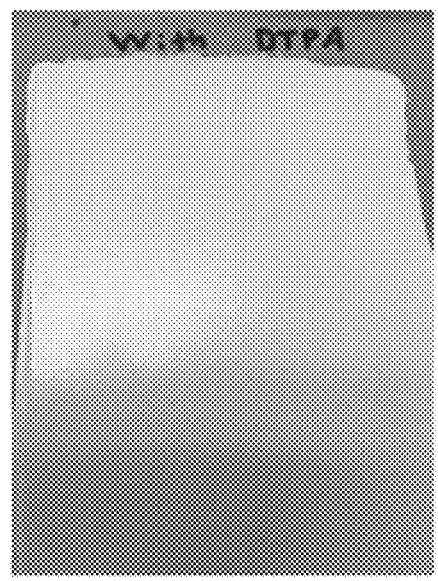
FIG. 6B is a picture showing application to a substrate of a MIC ready-mixed setting type joint compound which comprises pentasodium DTPA.

FIG. 6B is a picture showing that when the MIC ready-mixed setting type joint compound comprising MIC agent pentasodium diethylenetriamine pentaacetate is applied to a substrate, it produces a smooth monolete surface which provides a technical advantage over application of a ready-mixed setting type joint compound shown in FIG. 6A, where gypsum seeds cause voids (20) and an uneven surface.

Preferred MIC agents in this disclosure include, but are not limited to, diethylenetriamine pentaacetic acid (DTPA) and/or its salts, such as for example, pentasodium diethylenetriamine pentaacetate or calcium trisodium diethylenetriamine pentaacetate. Other suitable MIC agents include ethylenediamine tetraacetic acid (EDTA) and/or its salts, such as for example, sodium calcium edetate; and also hydroxyethyl-ethylene-diaminetriacetic acid (HEDTA) and its salts, such as for example, trisodium N-(hydroxyethyl)-ethylenediaminetriacetate.

A total amount of the MIC agent in the MIC ready mixed setting type joint compound mixture may be adjusted depending on a source of gypsum, water and/or other components. For formulations in which a metal contamination, especially with iron, is high, the MIC agent(s) should be used in higher amounts.

Typically, from about 0.01% to about 10% by weight of the MIC agent may be used, calculated as a percentage of dry calcined gypsum weight. For example, from about 0.01 g to about 10 g of the MIC agent may be used per 100 g of dry calcined gypsum. Preferably, from about 0.1% to about 5% by weight of the MIC agent may be used, calculated as a percentage of dry calcined gypsum weight.

The term "about" in this disclosure means plus/minus 10% of the value, and preferably, plus/minus 1% of the value. For example, about 100 means 100±10, and preferably, 100±1.

Preferably, the MIC ready-mixed setting type joint compound comprises DTPA and/or any salt thereof as the MIC agent. More preferably, the MIC ready-mixed setting type joint compound comprises pentasodium diethylenetriamine pentaacetate.

Preferably, the MIC ready-mixed setting type joint compound comprises from about 0.01% to about 10% by weight of DTPA and/or any salt thereof, such as for example, pentasodium diethylenetriamine pentaacetate (which may be abbreviated in this disclosure as pentasodium DTPA), as a percentage from the weight of dry calcined gypsum. In some embodiments, from about 0.01% to about 1% by weight of DTPA and/or pentasodium diethylenetriamine pentaacetate may be used, calculated as a percentage from the weight of dry calcined gypsum.

The MIC ready-mixed setting type joint compounds are prepared with calcium sulfate hemihydrate, also referred to as calcined gypsum or stucco. These MIC joint compounds are setting type joint compounds. Preferred MIC joint compounds include ready-mixed joint compounds which comprise calcined gypsum, water and retarders of gypsum setting.

Typically, the MIC joint compounds comprise 30% to 90% of calcined gypsum by weight based on the joint compound composition total weight, including water. Preferably, the MIC joint compounds comprise from 40% to 85% of calcined gypsum by weight based on the total weight the joint compound composition, including water. More preferably, the MIC joint compounds comprise from 45% to 80% of calcined gypsum by weight of the joint compound composition total weight, including water.

When mixed with water, the MIC joint compound may comprise from about 20% to about 50% by weight of water, based on the total weight of the MIC joint compound.

The MIC joint compounds may also comprise one or more of the following: calcium carbonate, limestone, perlite, expanded perlite, talc and/or mica. If present, these components may be used in an amount from about 1% to about 40% by weight, based on the weight of dry calcined gypsum. Clay, such as attapulgite clay, may be used in an amount from about 1% to about 10% by weight, based on the weight of dry calcined gypsum.

The MIC joint compound comprises one or more binders, such as a latex binder and/or starch. Typically, from about 1% to about 20% of the binder may be used by weight, based on the dry weight of calcined gypsum. For example, if 100 g of dry calcined gypsum is used, an amount of the binder may be in the range from about 1 g to about 20 gs.

Other components in the MIC joint compound mixture may include one or more of the following: a thickener, pH stabilizer, biocide, defoamer, preservative and/or wetting agent. Typically, each of these components may comprise from about 0.01% to about 10% by weight of the joint compound, excluding water.

The MIC joint compounds may comprise at least one low molecular weight polymer comprising a polyacrylate polymer, polyacrylamide polymer, polyacrylate/polyacrylamide co-polymer or any mixture thereof. The molecular weight of the low molecular weight polymer is in the range from about 1,500 to about 7,000 and more preferably from about 1,700 to about 6,500. Typically, the low molecular weight polymer is used in an amount from about 0.5% to about 20% by weight of the low molecular weight polymer, based on the dry weight of calcined gypsum. More preferably, from about 0.5% to about 10% by weight of the low molecular weight polymer, based on the dry weight of calcined gypsum.

Preferably, the MIC joint compounds comprise at least one non-calcium phosphate compound which may comprise zinc hexametaphosphate, potassium tripolyphosphate, tetrasodium pyrophosphate, tetra-potassium pyrophosphate, sodium tripolyphosphate, mono-ammonium phosphate, monobasic potassium phosphate or any combination thereof. Typically, from about 0.01% to about 10% by weight of the non-calcium phosphate compound may be used, based on the weight of dry calcined gypsum.

In the MIC joint compounds of this disclosure, preferred non-calcium phosphate compounds include tetra potassium pyrophosphate (TKPP), tetra sodium pyrophosphate (TSPP) or any combination thereof. TKPP and/or TSPP may be used in any amount required to prevent a setting reaction, typically, from about 0.01% to about 10% by weight, based on the weight of dry calcined gypsum. TKPP can be purchased as a 60% solution from Innophos, Inc., New Jersey.

The MIC setting type joint compounds of this disclosure can be made as ready-mixed. It has been discovered that the MIC agent works synergistically with a non-calcium phosphate compound in preventing the gypsum seed setting reaction. The MIC agent inhibits or diminishes formation of gypsum seeds during storage of a ready-mixed setting type joint compound and/or while a dry powder setting type joint compound is mixed with water.

One preferred formulation of the MIC ready-mixed setting type joint compound according to this disclosure comprises DTPA and/or its salt, such as for example, pentasodium DTPA, and a set retarder comprising TKPP. In these joint compounds, DTPA or its salt may be used in an amount from about 0.01% to about 10% by weight, based on the weight of dry calcined gypsum. TKPP may be used in an amount from about 0.01% to about 10% by weight, based on the weight of dry calcined gypsum.

Another preferred formulation of the MIC ready-mixed setting type joint compound according to this disclosure comprises DTPA and/or its salt, such as for example, pentasodium DTPA, and a set retarder comprising TSPP. In these joint compounds, DTPA or its salt may be used in an amount from about 0.01% to about 10% by weight, based on the weight of dry calcined gypsum. TSPP may be used in an amount from about 0.01% to about 10% by weight, based on the weight of dry calcined gypsum.

Yet another preferred formulation of the MIC ready-mixed setting type joint compound according to this disclosure comprises DTPA and/or its salt, such as for example, pentasodium DTPA, and a set retarder comprising a combination of TKPP and TSPP. In these compounds, DTPA or its salt may be used in an amount from about 0.01% to about 10% by weight, based on the weight of dry calcined gypsum. The total of TKPP and TSPP may be in an amount from about 0.01% to about 10% by weight, based on the weight of dry calcined gypsum. TKPP and TSPP may be used in equal proportions or one of the two may be used an amount larger than the other one. The ratios between TKPP and TSPP may be in a range from 1:100 to 100:1, respectively.

In other aspect, at least one MIC agent comprising aminopolycarboxylic acid and/or a salt thereof may be added to a mixer during mixing of a dry powder conventional or light-weight setting type joint compound with water. This prevents a gypsum seed setting reaction in a mixer. Such seed setting reactions may be triggered by contaminating metal ions, especially iron ions. A source of metal ions may be water, contaminants in calcined gypsum, calcium carbonate, other components and/or oxidation of the metal mixer itself.

The total amount of the MIC agent added to the setting type joint compound mixture may be adjusted, depending on a source of calcined gypsum, water and/or other components. Typically, from about 0.01% to about 10% by weight of the MIC agent may be used, calculated as a percentage of the weight of dry calcined gypsum in a mixer.

The MIC ready-mixed setting type joint compound of this disclosure may comprise the following components as shown in Table 1. General ranges for the components are also listed in Table 1.

TABLE 1

| Component | Percent by weight (wt %), calculated as a percentage from the weight of dry calcined gypsum |
|---|---|
| Calcined Gypsum | 100 |
| Talc | 0-40 |
| Calcium Carbonate | 0-40 |
| Perlite | 0-40 |
| Attapulgite Clay | 1-10 |
| Thickener | 0.01-1 |
| Binder | 0.5-20 |
| MIC agent (i.e. Pentasodium DTPA) | 0.01-10 |
| Non-calcium phosphate compound (i.e. TKPP) | 0.01-10 |
| Preservative | 0.1-1 |
| Water | 25-100 |

As shown in Table 1, the MIC ready-mixed setting type joint compound may comprise from 0.01 g to 10 g of a non-calcium phosphate compound, i.e. TKPP, and from 0.01 g to 10 g of a MIC agent, i.e. DTPA, per every 100 g of dry calcined gypsum. This compound can be formulated with 25 g to 100 g of water, per every 100 g of dry calcined gypsum.

A ready-mixed setting type joint compound typically has pH in the range from about 7.5 to about 10. The MIC agents provided in this disclosure are metal ion chelators, whose function depends on pH. The MIC agents provided in this disclosure, in particular DTPA and its salts, are capable of preventing gypsum seed formation in a MIC ready-mixed setting type joint compound in a broad range of pH, including pH in the range from about 7.5 to about 10, as measured at room temperature (21° C.).

In further embodiments, the present disclosure provides methods for preventing formation of gypsum seeds in a ready-mixed setting type joint compound mixture. In one embodiment, the method comprises adding one or more of the MIC agents provided in this disclosure during manufacturing of a ready-mixed setting type joint compound. Typically, between 0.01% to 10% of the MIC agent may be added by weight, calculated as a percentage of the weight of dry calcined gypsum. It has been discovered that these ready-mixed setting type joint compounds which comprise one or more the MIC agents have a longer shelf life and form fewer gypsum seeds than ready-mixed setting type joint compounds which do not comprise the MIC agent.

This technical advantage is illustrated by comparing FIG. 5A (ready-mixed setting type joint compound without a MIC agent) to FIG. 5B (MIC ready-mixed setting type joint compound which comprises a MIC agent such as pentasodium DTPA), and also by comparing application of a ready-mixed setting type joint compound without a MIC agent to a substrate (FIG. 6A) with application of a MIC joint compound which comprises a MIC agent (pentasodium DTPA) to the same substrate (FIG. 6B).

Other methods include adding one or more of the MIC agents into a mixer when a dry powder setting type joint compound is mixed with water and other ingredients. Typically, between 0.01% to 10% by weight of the MIC agent may be added, based on the weight of dry calcined gypsum.

Other methods include adding one or more of the MIC agents to a ready-mixed setting type joint compound. This method increases the open time during which a joint compound is workable. Typically, between 0.01% to 10% of the MIC agent may be added by weight, based on the weight of dry calcined gypsum.

Further embodiments provide a method for controlling a setting reaction in a setting type joint compound, which may be a ready-mixed setting type joint compound, the method comprises mixing the joint compound with 1) one or more of the MIC agents in the amount from 0.01% to 10% by weight, based on the weight of dry calcined gypsum; and 2) one or more of non-calcium phosphate compounds in the amount from 0.01% to 10% by weight, based on the weight of dry calcined gypsum.

The set activator blend of zinc sulfate and alum described in this disclosure may be then mixed with the setting type joint compound when the compound is to be applied to a substrate. Zinc sulfate and alum may be blended together in a ratio in the range from 3:1 to 2:1 by dry weight of zinc sulfate to alum. The blend is then used in an amount from 0.5% to 3% by weight of a setting type joint compound, excluding water. The method can be performed at a temperature in the range from about 40° F. to about 95° F.

Example 1

Two ready-mixed setting type joint compounds were prepared. A first ready-mixed joint compound comprised calcined gypsum, water, a latex binder, calcium carbonate, a set retarder and TKPP. A second ready-mixed setting type joint compound was prepared with the same components as the first ready-mixed setting type joint compound, but pentasodium DTPA (VERSENEX™ 80 chelating agent purchased from the Dow Chemical Company) was added to the formulation.

Both ready-mixed setting type joint compounds were allowed to stay on a shelf and both compounds were periodically examined for formation of gypsum seeds during a period of several months. The first ready-mixed setting type joint compound started developing gypsum seeds at about one week after the compounds were prepared. No gypsum seeds were detected in the second ready-mixed setting type joint compound comprising pentasodium DTPA.

More than 6 months after the two ready-mixed setting type joint compounds were prepared, both compounds were examined, and pictures were taken. As can be seen in FIG. 5B, no gypsum seeds were detected in the second ready-mixed setting type joint compound comprising pentasodium DTPA. At the same time, the first ready-mixed setting type joint compound which did not comprise pentasodium DTPA or any other MIC agent, developed gypsum seeds, as shown in FIG. 5A.

As can be seen from FIG. 6B, applying the second ready-mixed setting type joint compound comprising pentasodium DTPA to a substrate, produced a smooth surface. In contrast, application of the first ready-mixed setting type joint compound which did not comprise pentasodium DTPA to a substrate produced a defective surface with voids, as shown in FIG. 6A.

What is claimed is:

1. A method for inhibiting formation of gypsum seeds in a ready-mixed setting type joint compound, the method comprising:
   mixing at least calcined gypsum, water, at least one non-calcium phosphate compound and at least one metal ion control agent comprising an aminopolycarboxylic acid and/or a salt thereof, and thereby obtaining a ready-mixed setting type joint compound,
   wherein the metal ion control agent is used in an amount from about 0.01% to about 10% by weight of calcined gypsum; and wherein the metal ion control agent inhibits formation of gypsum seeds in the ready-mixed setting type joint compound during storage; and wherein the method further comprises blending together a first activator and a second activator, and thereby obtaining a set activator blend; and mixing the set activator blend with the ready-mixed setting type joint compound; and wherein the first set activator is zinc oxide, zinc hydroxide and/or zinc salt and wherein the second set activator is aluminum oxide, aluminum hydroxide and/or aluminum salt;

wherein the ratio of the first set activator to the second set activator in the set activator blend is in the range from 3:1 to 1:1 by dry weight of the first set activator to the second set activator, and the mixing of the set activator blend with the ready-mixed setting type joint compound is performed at a temperature in the range from 40° F. to 65° F., and wherein the set activator blend is added in an amount from 0.5% to 5% by weight to the setting joint compound, excluding water.

2. The method of claim 1, wherein the first set activator is zinc sulfate and wherein the second set activator is alum.

3. The method of claim 1, wherein the non-calcium phosphate compound comprises zinc hexametaphosphate, potassium tripolyphosphate, tetra sodium pyrophosphate, tetra potassium pyrophosphate, sodium tripolyphosphate, mono-ammonium phosphate, monobasic potassium phosphate, or any combination thereof.

4. The method of claim 1, wherein the metal ion control agent comprises diethylenetriamine pentaacetic acid (DTPA), pentasodium diethylenetriamine pentaacetate, calcium trisodium diethylenetriamine pentaacetate, ethylenediamine tetraacetic acid (EDTA), sodium calcium edetate, hydroxy-ethyl-ethylene-diaminetriacetic acid (HEDTA), trisodium N-(hydroxyethyl)-ethylenediaminetriacetate, or any combination thereof.

5. The method of claim 1, wherein from about 0.01% to about 10% by weight of the non-calcium phosphate compound is used, calculated as a percentage of the weight of dry calcined gypsum.

6. The method of claim 1, wherein the metal ion control agent comprises pentasodium diethylenetriamine pentaacetate in an amount from about 0.01% to about 10% by weight, based on the weight of dry calcined gypsum and wherein the non-calcium phosphate compound comprises tetra-potassium pyrophosphate (TKPP) in an amount from about 0.01% to about 10% by weight and/or tetra-sodium pyrophosphate (TKPP) in an amount from about 0.01% to about 10% by weight, all calculations based on the weight of dry calcined gypsum.

7. The method of claim 1, wherein at least one of the following is further mixed with the setting type joint compound: a binder, calcium carbonate, mica, talc, clay, a low molecular weight polymer, or any combination thereof.

* * * * *